Nov. 4, 1952 K. SCHLESINGER 2,617,076
ELECTROSTATIC DEFLECTION SYSTEM
Filed Jan. 13, 1948 3 Sheets-Sheet 1
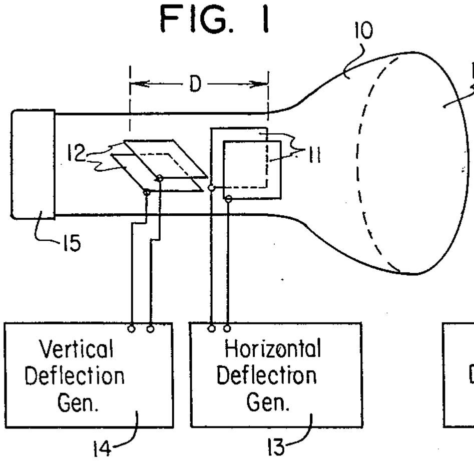
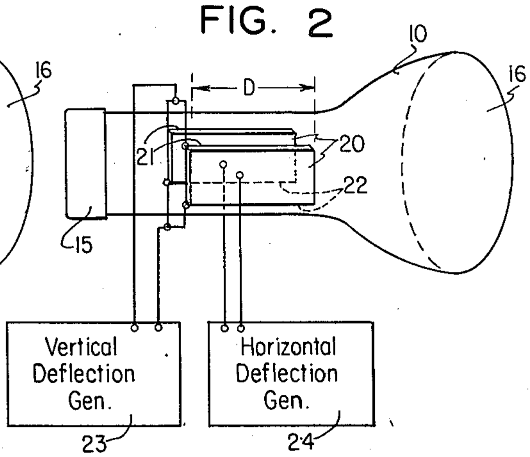
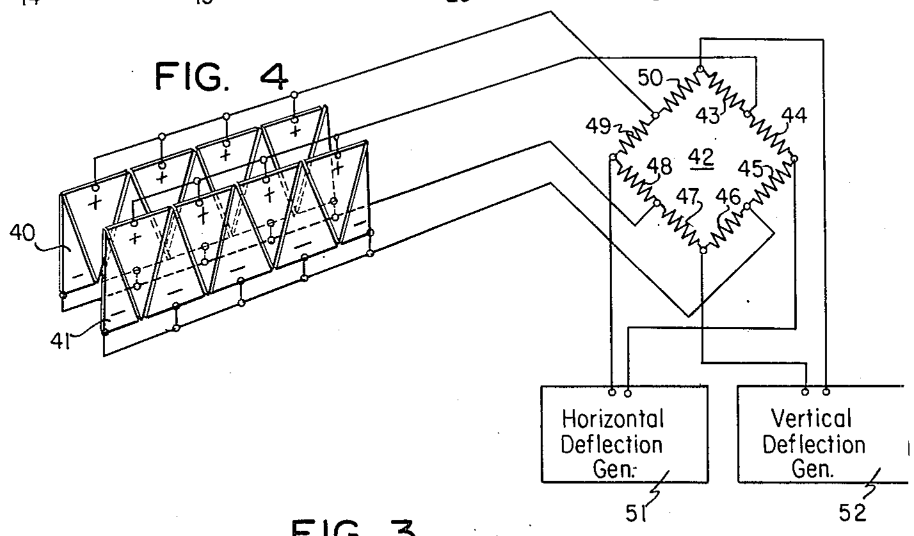
FIG. 3
FIG 3a
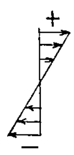
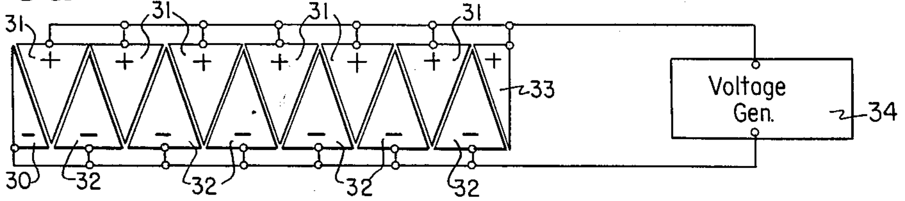
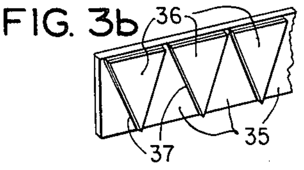
INVENTOR.
Kurt Schlesinger
BY
Thomas L. Mueller
Atty.

Nov. 4, 1952 K. SCHLESINGER 2,617,076

ELECTROSTATIC DEFLECTION SYSTEM

Filed Jan. 13, 1948 3 Sheets-Sheet 2

*INVENTOR.*
Kurt Schlesinger

*BY* Foorman L. Mueller

Atty.

*INVENTOR.*
Kurt Schlesinger
*BY*
Norman L. Mueller
Atty.

Patented Nov. 4, 1952

2,617,076

UNITED STATES PATENT OFFICE 2,617,076

ELECTROSTATIC DEFLECTION SYSTEM

Kurt Schlesinger, Maywood, Ill., assignor to Motorola, Inc., Chicago, Ill., a corporation of Illinois Application January 13, 1948, Serial No. 2,059

17 Claims. (Cl. 315—23)

This invention relates generally to means for producing electrostatic fields and more particularly to an improved electrostatic deflection system for use with cathode ray tubes.

In the various applications of cathode ray tubes, such as in oscilloscopes, television systems, and radar systems, means are provided for causing deflection of the electron beam. It has been found that either electrostatic or electromagnetic fields may be satisfactorily used for this purpose. Electrostatic deflection systems have the advantage that a comparatively small amount of energy is required for producing the deflection as contrasted with electromagnetic systems which require changing currents and systems for producing deflection voltages are simpler than those required for producing deflection currents. Also, ion blemish appearing in electromagnetic deflection is not present in electrostatic deflection resulting in longer life of the screen of the cathode ray tube.

Electrostatic deflection systems, however, have the disadvantage that a relatively large space is required along the beam for producing the deflection. This is caused by the fact that it has been necessary to produce horizontal and vertical deflection in sequence along different portions of the path of the cathode ray beam so that the plates for deflection in one direction will not shunt the field which produce the deflection in the other direction. To prevent this shunting action, the deflecting plates for the vertical and horizontal systems must be spaced. It is obvious that the amount of deflection which can be obtained depends upon the voltage applied to the plates, the spacing of the plates, and the length along the path of the beam occupied by the plates. As it is desired to keep the cathode ray tubes as small as possible, it has been customary to use relatively narrow spacing between the plates to obtain the required deflection. This limits the diameter of the cathode ray beam and, accordingly, excludes the use of high power, high intensity cathode ray tubes.

It is, therefore, an object of the present invention to provide an improved electrostatic deflection system for cathode ray tubes which provides simultaneous horizontal and vertical deflection of the beam along the same portion of the path traversed by the beam.

A further object of this invention is the provision of an electrostatic deflection system including electrodes which produce electrostatic fields in a given space which are positioned at right angles with respect to each other, with the electrodes being aranged so that they are not effective to shunt the electrostatic fields.

A still further object of this invention is the provision of a simple and improved system for applying the deflection voltages to the electrodes of an electrostatic deflection system.

A feature of this invention is the provision of a pair of parallel plates made of high resistance material and a deflecting voltage connected across the plates to provide a distributed voltage across the plates which produces an electrostatic field parallel to the plates.

A further feature of this invention is the provision of a pair of parallel plates having conducting surfaces positioned thereon and means for energizing the conducting surfaces to produce an electrostatic field parallel to the plates and a second electrostatic field perpendicular to the plates.

A still further feature of this invention is the provision of an electrostatic deflection system including perpendicularly positioned pairs of plates each of which produces an electrostatic field parallel to the plates thereof, said plates being out of the path of the fields and, therefore, having substantially no shunting effect thereon.

Further objects, features and advantages will be apparent from a consideration of the following description taken in connection with the accompanying drawings in which:

Fig. 1 illustrates a standard electrostatic deflection system;

Fig. 2 illustrates an improved electrostatic deflection system in accordance with the invention;

Fig. 3 illustrates the construction of a deflection plate adapted to produce an electrostatic field parallel thereto;

Figure 5:
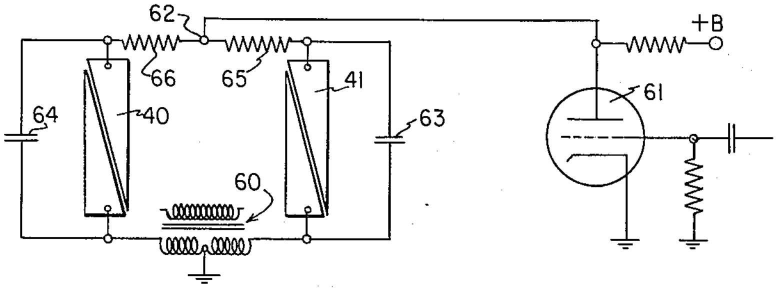
Figure 6:
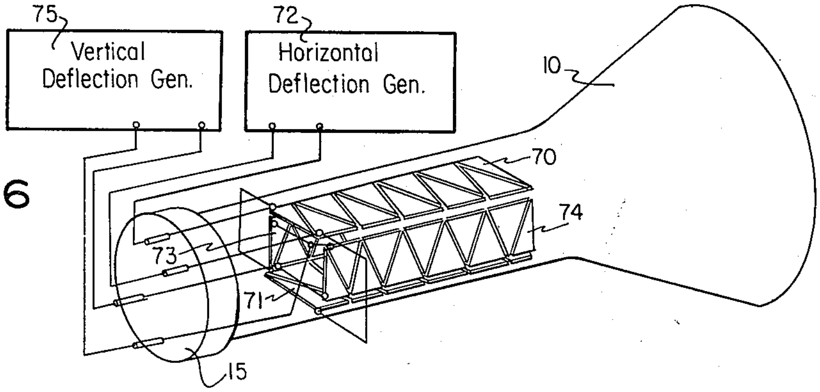
Figures 7, 8:
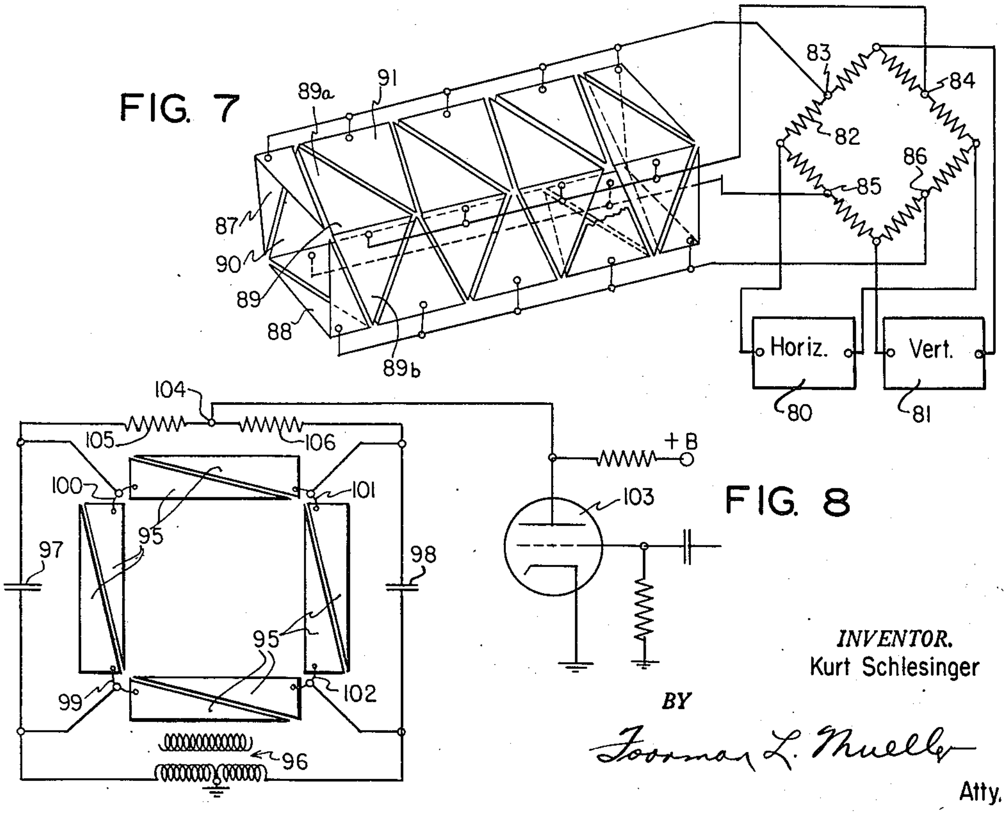
Figures 9, 10:
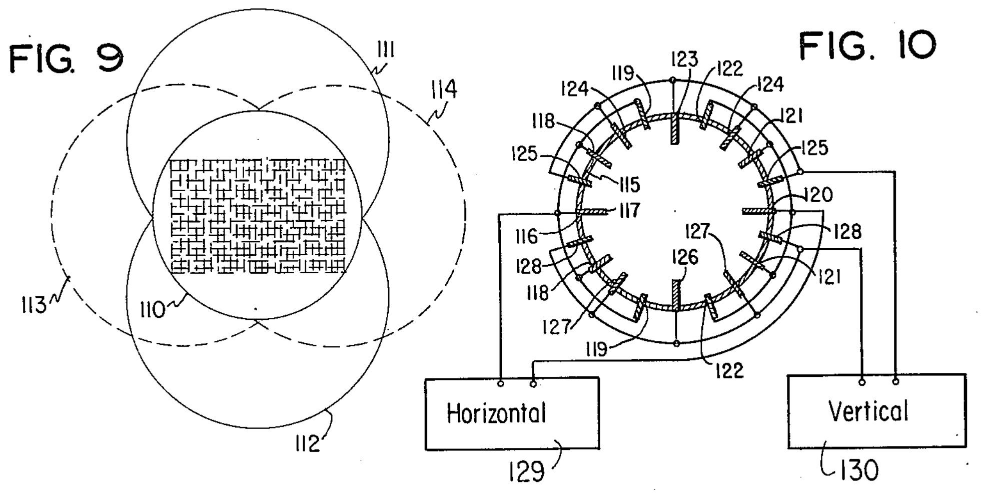
Figure 11:
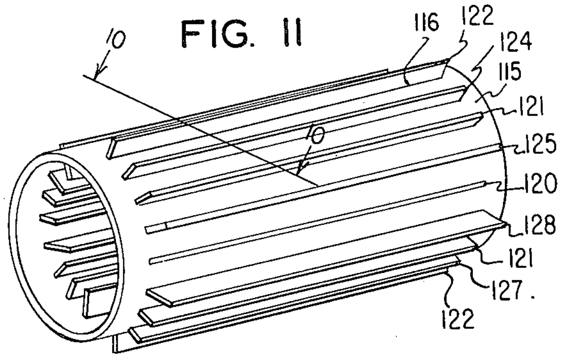

Fig. 3*a* is a curve showing the distribution of the field field on the plate of Fig. 3;

Fig. 3*b* shows a modified plate construction;

Fig. 4 illustrates a deflection system using plates as illustrated in Fig. 3 and an energizing circuit therefor;

Fig. 5 illustrates an improved energizing system for the deflection system as illustrated in Fig. 4;

Fig. 6 illustrates a box-type deflection system in which separate plates are provided for horizontal and vertical deflection;

Figs. 7 and 8 illustrate a modified box-type system;

Fig. 9, 10 and 11 illustrate a deflection system of cylindrical form; and

Figure 12:
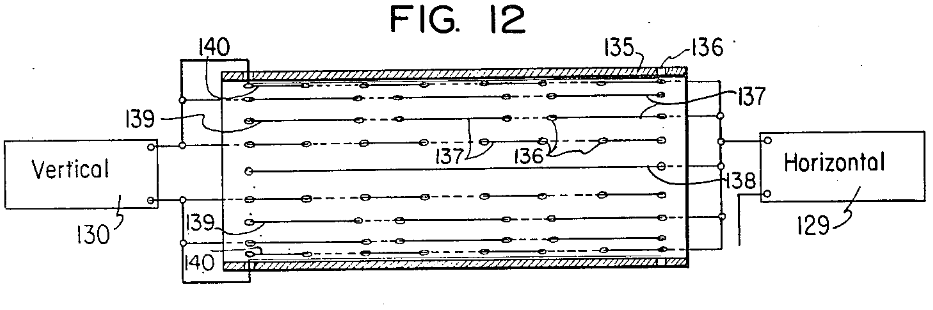

Fig. 12 illustrates a modified cylindrical system.

In practicing the invention there is provided an electrostatic deflection system adapted to provide a pair of fields at right angles to each other in the same space without undesired interaction between the two fields. This may be accomplished by deflecting plates which are constructed and arranged to produce an electrostatic field parallel to the plates. The same plates may also be used for producing a field perpendicular thereto in the usual manner so that both horizontal and vertical deflection can thereby be accomplished in the same space by a single pair of plates. Alternatively, two sets of plates positioned at right angles with respect to each other may be used to produce simultaneous fields at right angles to each other, and as each pair of plates produces a field parallel thereto the plates for one field will not shunt the other field. This result can also be obtained by use of elements for producing the field having small dimensions in the directions of the fields so that very little shunting action is caused.

Referring now more specifically to the drawings, in Fig. 1 there is illustrated a cathode ray tube 10 including horizontal deflection plates 11 and vertical deflection plates 12 which are energized by horizontal deflection generator 13 and vertical deflection generator 14, respectively. The electron beam produced by the electron gun indicated generally at 15 passes first through the vertical deflection plates 12 and then through the horizontal deflection plates 11 prior to striking the screen 16. It is to be noted that the space available for deflection of the beam indicated as D must, therefore, be divided to accommodate both the horizontal and vertical deflection plates. There also must be a spacing between the plates to eliminate the tendency of each pair of plates to shunt the field of the other pair of plates. Therefore, less than half of the deflecting space is available for each set of plates.

Fig. 2 illustrates a cathode ray tube generally similar to the cathode ray tube 10 of Fig. 1 including an electron gun 15 and a screen 16. The horizontal and vertical deflection plates 11 and 12 of Fig. 1 are replaced by a single set of deflection plates indicated by reference numeral 20. The deflecting plates 20 are made of material having a very high resistance so that when a potential is applied between the top edge 21 and the bottom edge 22 of each plate, a relatively small current flows through the plate and the potential difference is uniformly distributed across the width of the plate. To provide this uniform distribution of potential, conducting surfaces may be provided along the edges 21 and 22 of the plates so that the voltage is distributed uniformly across the width of the plate and is substantially constant along the length of each plate. The vertical deflection generator 23 is connected to the conducting edges 21 and 22 to provide such a potential across the plates 20. It will be apparent that the distributed voltage across the widths of the plates will cause a vertically extending electrostatic field between the plates which is substantially parallel to the plates. This field will be effective to cause vertical deflection of the cathode ray beam passing between the plates and by controlling the amount of the voltage, the amount of the deflection can be regulated. To provide horizontal deflection of the cathode ray beam by the plates 20, the plates may be connected to a horizontal deflection generator 24 in such manner that a field is produced which is perpendicular to the plates. This may be accomplished by making connection centrally of the plates as illustrated but this is not critical as all points of the plates will be at the same potential for horizontal deflection provided the resistivity of the plates is small compared to that of the vertical deflecting generator so that the voltage drop across the plates is small. This may be overcome by use of a bridge network as will be described.

It is to be noted that for both horizontal and vertical deflection, the plates 20 extend along the path of the beam the entire distance available for deflection as indicated by the distance D. Therefore, it is possible to produce greater deflection of the beam than with conventional deflecting plates using the same field strength or to produce the same deflection by use of a weaker field. In practice in order to permit the use of a relatively large beam diameter, it will probably be preferable to provide greater spacing between the deflecting plates 20 with the result that the intensity of the field will be less. However, by providing a greater distance over which the deflection takes place, the required deflection angle may still be obtained. Although in accordance with the invention any suitable high resistive material may be used for the deflecting plates 20, it has been found that high resistance plates can be made which are satisfactory for use in a high vacuum by providing a colloidal graphite coating on a glass plate which has a rough surface.

Fig. 3 illustrates a modified electrostatic deflection plate which may be used in the system of Fig. 2 instead of plates made of highly resistive material. In Fig. 3 spaced conducting elements 30, 31, 32 and 33 are provided as by providing a conducting coating on any suitable insulating material or by supporting conducting plates by insulating means. It is noted that the conducting elements are triangular shaped and interleaved. The elements 30 and 32 are connected together to one terminal of voltage generator 34 and the elements 31 and 33 are connected together to the other terminal of the voltage generator. The elements may be of identical size and shape except that elements 30 and 33 are half sections as required to complete the rectangular plate. It is obvious that by applying a voltage between the two terminals of the conducting elements, an electrostatic field is produced across the plate which varies substantially linearly from a maximum positive value at the edge of the plate marked plus to a maximum negative value at the edge of the plate marked minus. As the conducting elements are triangularly shaped, the electrostatic field produced by each varies from a maximum at the base of the triangle to a minimum adjacent the apex of the triangle. The elements of two sets are interleaved and, therefore, the graduated electrostatic fields produced by the two sets of conducting elements are combined to provide a uniformly varying electrostatic field across the width of the plates. This distribution of the field is indicated in the chart shown in Fig. 3*a*. Therefore, the conducting electrodes in Fig. 3 will produce an electrostatic field parallel to the plate in the same manner as the highly resistive plates 20 of Fig. 2. The deflection plate can be made by using a rectangular conducting sheet and providing triangular sections thereon which are insulated by the sheet as shown in Fig. 3*b*. Potential may then be applied between the sheet 35 and the sections 36 which are insulated therefrom by material 37. This provides a simple and rugged structure. By properly constructing such a plate, the capacity between the sections 36 and the sheet 35 can be made the value desired for use in the systems of Figs. 5 and 8 as will be explained.

In Fig. 4 there is illustrated a deflection system using a pair of parallel plates 40 and 41 each of which may be identical to the plate illustrated in Fig. 3. These plates are connected to a bridge network 42 including identical resistors 43 to 50, inclusive. The horizontal deflection generator 51 is connected across one diagonal of the bridge and the vertical deflection generator 52 is connected across the other diagonal. It is seen, therefore, that for horizontal deflection the positive and negative elements of the plate 40 are connected to one potential and the positive and negative elements of the plate 41 are connected to a different potential to thereby provide an electrostatic field between the plates extending substantially perpendicular to the plates. For vertical deflection the same potential is applied to the positive elements of the plates 40 and 41 and a different potential is applied to the negative elements of the plates 40 and 41. This produces an electrostatic field extending parallel to the plates which is, therefore, at right angles to the first-mentioned electrostatic field. The resistors of the bridge network 42 isolate the voltages used for horizontal and vertical deflection so that no objectionable interaction is produced.

In Fig. 5 there is illustrated a modified arrangement for energizing the deflection plates 40 and 41 which may be used when the frequency of the voltage applied to one set of plates is greatly different from the frequency of the voltage applied to the other set of plates. This is the situation which occurs in a television receiver in which the vertical deflection is at a frequency of 60 cycles per second and the horizontal deflection is at a frequency of 15,750 cycles per second. The deflection plates 40 and 41 may be constructed as shown in Fig. 3, being illustrated only schematically in Fig. 5. In this system the horizontal deflection voltage is applied through transformer 60 and the vertical deflection voltage is applied through amplifier 61, the output of which is connected to the terminal 62. For the high frequencies of the horizontal deflection voltage the condensers 63 and 64 are in effect a short circuit so that both positive and negative elements of the deflection plates are directly connected to the transformer. For the low frequencies of the vertical deflection voltage, the condensers 63 and 64 are substantially open circuits so that the vertical deflection voltage is applied through resistors 65 and 66 across the elements of the deflection plates 40 and 41 and through the transformer 60 to ground. At such low frequencies the transformer 60 represents a low impedance and substantially the entire voltage produced by the amplifier 61 is, therefore, applied across the deflection plates. It may be possible to completely omit the condensers 63 and 64 in certain instances where the capacity between the elements of the deflecting plates is sufficient, as in structures such as illustrated in Fig. 3*b*.

In Fig. 6 there is illustrated a modified deflection system for use in a cathode ray tube. In this system the electrodes form a closed structure which has the advantage that it is self-shielding and the effect of wall charges on the inside of the tube on the deflection is eliminated. The deflection structure includes a pair of deflecting plates 70 and 71 which are horizontally positioned within the tube. These plates may be of the form shown in Fig. 3 and are connected to a horizontal deflection generator 72 to produce a horizontal electrostatic field which provides horizontal deflection of the cathode ray beam. A pair of vertically positioned plates 73 and 74 are also provided which are connected to vertical deflection generator 75 for providing vertical deflection to the cathode ray beam. It is to be noted that each pair of deflection plates in Fig. 6 produces a field in one direction only, that is, the direction which is parallel to the plates themselves. Therefore, the plates which set up each field are perpendicular to the other field and will not tend to shunt the other field. It is also noted that each deflection generator is connected to only one set of plates and, therefore, a mixing network is not required as in the systems wherein both horizontal and vertical deflection is produced by the same set of plates.

In Fig. 7 there is illustrated a deflection system generally similar to that of Fig. 4 in that the same plates are used for both vertical and horizontal deflection. However, in this system a box-like structure is provided with the result that a larger effective electrode area is provided. The deflection plates are connected to horizontal and vertical deflection generators 80 and 81 through a bridge network 82 generally similar to that of Fig. 4. It will be noted that the terminals 83 and 84 are at the same potential for vertical deflection and the terminals 85 and 86 are at a different potential. Each pair of terminals 83 and 85, and 84 and 86, are at the same potential for horizontal deflection. The deflection plates have conducting elements including portions which extend at right angles with each portion being triangular shaped and the portions being interfitted to form a substantially closed box. As an example, it is noted that the plate 89 includes a horizontal portion 89*a* and a vertical portion 89*b*. The conducting elements are so connected to the bridge network that for vertical deflection all of the top horizontally extending portions are at one potential and all of the bottom horizontally extending portions are at a different potential. Similarly, for horizontal deflection all of the vertically extending portions on one side are at one potential and the vertically extending portions on the other side are at a different potential. For example, for vertical deflection as the points 83 and 84 are at the same potential, the elements 87, 89 and 91 are all at the same potential. The elements 88 and 90 are connected to the points 85 and 86 which are at a different potential to thereby provide a vertical field which produces vertical deflection. For horizontal deflection, the elements 87, 90 and 91 are at one potential and the elements 88 and 89 are at a different potential to thereby produce a horizontal field which results in horizontal deflection of the beam. The manner in which the remaining elements in Fig. 7 are connected and the operation thereof will be readily apparent and further description is believed unnecessary. It is obvious that each portion of each of the plates is effective in producing both the horizontal and vertical fields so that maximum deflection will be obtained in a limited amount of space.

Fig. 8 illustrates a simplified circuit for energizing deflection plates such as illustrated in Fig. 7 which is suitable for use in applications in which the deflection in one direction is at a relatively high frequency and the deflection in the other direction is at a relatively low frequency.

This circuit is, of course, applicable for use in television systems. The deflection plates 95 are illustrated schematically to simplify the drawing. A horizontal electrostatic field is provided by applying the horizontal deflection voltage to the transformer 96. For the high frequencies of the horizontal deflection voltage, the condensers 97 and 98 are in effect short circuits so that the terminals 99 and 100 are at one potential and the terminals 101 and 102 at a different potential. The low frequency vertical deflection voltage is applied to the grid of tube 103 and amplified thereby with the amplified voltage being applied to the terminal 104 between the resistors 105 and 106. At these frequencies the condensers 97 and 98 are substantially open circuits so that the potential is in effect applied through the resistors 105 and 106 and across the deflection plates to ground. The terminals 100 and 101 will, therefore, be at one potential and the terminals 99 and 102 at a different potential. The transformer 96 will present a relatively low impedance at such low frequencies so that substantially the entire deflection voltage will be applied across the deflection plates.

In Figs. 9 to 12 there are illustrated systems for producing electrostatic fields which utilize cylindrical deflecting means. It is known that to produce an electrostatic field by deflecting means in cylindrical form, the field must be distributed about each half of the cylinder in a sinusoidal distribution. This is illustrated in Fig. 9 in which the circle 110 indicates the cylindrical deflecting means and the lobes 111 and 112 indicate the distribution of the field required to produce a vertical field having parallel flux lines. The lobes 113 and 114 represent the distribution of the horizontal field required to produce such a field having parallel lines.

In Figs. 10 and 11 there is illustrated one structural embodiment of the invention which will produce fields at right angles to each other and in which the lines in each field are substantially parallel. This structure includes a cylindrical supporting body 115 which is made of metal and when used in a cathode ray tube will be at anode potential. The body includes longitudinal slots 116 spaced about the circumference thereof which extend substantially the entire length of the cylindrical body. Metal conducting blades 117 to 128, inclusive, are provided in the slots 116 and are insulated from the body. The blades may be secured to the body in any suitable means as by an insulating cement. The blades 117, 118 and 119 are connected to one terminal of the horizontal deflection generator 129 and the blades 120, 121 and 122 are connected to the other terminal of the horizontal deflection generator. It will be noted that the blades extend into the interior of the cylindrical body to different depths, with blades 117 and 120 extending to the greatest depth, blades 118 and 121 extending to a lesser depth and blades 119 and 122 barely extending into the cylinder. This configuration of the blades results in a tapering of the field to produce a substantially sinusoidal distribution on each side of the cylinder as indicated in Fig. 9. Similarly, the blades 123, 124 and 125 are connected to one terminal of the vertical deflection generator 130 and blades 126, 127 and 128 are connected to the other terminal of the generator 30 to produce a vertically extending field. The blades for producing vertical deflection also extend into the cylinder varying depths so that the vertical field will be of substantially sinusoidal distribution and the flux lines will be substantially parallel. It is noted that such a system can be used in a cathode ray tube by providing only four terminals in the tube as it is not necessary to bring out separate terminals for each of the blades. In this system, it is not necessary to mix the voltages from the two generators and, therefore, no danger of interaction is encountered.

The deflection system illustrated in Fig. 12, while operating on generally the same principles, utilizes a different means for providing the desired distribution of the field. In this system a metal cylinder 135 is provided having openings 136 therein for insulated conductors 137 so that only portions of the conductors are on the inside of the cylinder and are effective to produce electrostatic fields. As in Fig. 10, the metal cylinder should preferably be at the anode potential of the cathode ray tube. In the structure shown a network of conductors is provided to form each plate for producing the horizontal and vertical fields. In Fig. 12 only one-half of the cylinder 135 is illustrated and, therefore, only one-half of the conductors which form the plates are illustrated. The network of conductors which forms one plate for the horizontal field includes a center conductor 138 which extends substantially the entire length of the cylinder, a pair of conductors 139 spaced on either side of the center conductor which extends a smaller part of the length, and a second pair of conductors 140 spaced farther from the center and extending a still smaller portion of the length of the cylinder. This will produce a field of substantially sinusoidal distribution so that the flux lines of the horizontal fields will be substantially parallel. Similarly, the vertical field is produced by networks of conductors each of which includes a center conductor extending substantially the entire length of the cylinder, and conductors spaced from the center conductor extending smaller portions of the length of the cylinder to produce a similar sinusoidal field distribution.

It is apparent that in the structure of Figs. 10 to 12, inclusive, a greater or smaller number of blades or conductors can be used to provide the distribution of the field desired. Also other arrangements can be used which will result in a similar distribution of the fields to provide fields which extend at right angles to each other and which includes substantially parallel flux lines.

It is seen from the above that there is provided an improved electrostatic deflection system which is suitable for use with cathode ray tubes and more particularly for use in television systems in which vertical and horizontal deflection of the beam may be produced in substantially the same space. This is accomplished without undesired shunting of either of the fields by the deflection system which produces the other field. Relatively simple arrangements are provided for exciting the various systems so that a complete system which is relatively simple and inexpensive is provided.

While I have described certain embodiments of my invention which are illustrative thereof, it is apparent that various changes and modifications can be made therein without departing from the intended scope of the invention as defined in the appended claims.

I claim:

1. An electrostatic deflection system adapted to produce two fluctuating electrostatic fields positioned at right angles to each other in the same space for deflecting an object in said space in two directions positioned at right angles to each other comprising, a pair of parallel positioned plates, said plates including conducting elements thereon, and two sources of sawtooth voltage waves each of which is connected to all of said conducting elements to produce an electrostatic field perpendicular to said plates and a second electrostatic field parallel to said plates.

2. A deflection system in accordance with claim 1 in which said conducting elements are of triangular shape and are positioned on each plate with the bases of the triangles of adjacent elements positioned on opposite edges of said plate to provide an interleaved structure.

3. An electrostatic deflection system adapted to produce two fluctuating electrostatic fields in a space traversed by an electron beam which are positioned at right angles to the path of said beam and to each other comprising, a pair of rectangular plates having edges positioned parallel to the path of said beam and to each other, each of said plates including a plurality of triangular shaped conducting portions with the bases of the triangles of adjacent portions being positioned on opposite edges of said plates, first and second independent sources of sawtooth voltage waves for energizing said conducting portions each including a pair of terminals, and means for connecting each of said portions to both of said sources so that all the conducting portions on each plate are at the same potential with respect to said first source, and the alternate portions on both of the plates are at the same potential with respect to said second source.

4. An electrostatic deflection system adapted to produce two electrostatic fields in a given space which are positioned at right angles to each other comprising, a pair of rectangular plates positioned parallel to each other, a plurality of triangular shaped conducting elements positioned on said plates with the bases of the triangles of adjacent elements being positioned on opposite edges of said plates, first and second independent voltage sources for energizing said conducting elements, a bridge network for connecting said elements to said voltage sources, said conducting elements on each plate being connected to points on said network at potentials corresponding to said first voltage source to provide an electrostatic field between said plates, and the alternative elements on both of said plates being connected to points on said network at potentials corresponding to said second voltage source to produce an electrostatic field parallel to said plates.

5. An electrostatic deflection system producing a fluctuating electrostatic field extending substantially at right angles to an electron beam for deflecting the same including in combination, a pair of parallel positioned plates including wedge-shaped conducting portions extending substantially perpendicular to the electron beam, and a source of sawtooth voltage waves connected across alternate conducting portions to produce an electrostatic field parallel to said plates.

6. An electrostatic deflection system adapted to produce a fluctuating electrostatic field in a space traversed by an electron beam at right angles to the path of said beam including in combination, a pair of rectangular plates having edges positioned parallel to the path of said beam and to each other, said plates including a plurality of spaced triangular shaped conducting portions with the bases of adjacent triangular portions positioned on opposite edges of said plates, a source of sawtooth voltage waves for energizing said conducting portions, and means for connecting said portions to said source so that said voltage waves are applied across alternate conducting portions.

7. Apparatus for producing a fluctuating electrostatic deflecting field for an electron beam including a plurality of spaced wedge-shaped conducting elements extending substantially perpendicular to the direction of the electron beam with the alternate elements having the apexes thereof pointed in opposite directions, means for producing a sawtooth voltage wave, and means for applying said voltage wave across said alternate elements to produce an electrostatic field substantially perpendicular to the direction of said beam.

8. An electrostatic deflection system for producing a pair of electrostatic fields extending at right angles to each other in a given space, said system comprising four groups of conducting elements symmetrically positioned about said space, each of said conducting elements including an enlarged portion and reduced portions extending therefrom, the reduced portions of the elements of each group being interleaved with the reduced portions of the elements of the adjacent groups whereby said four groups form a substantially completely enclosed structure, and means connecting first and second independent sources of sawtooth voltage waves to said conducting elements.

9. An electrostatic system for deflecting an electron beam in two directions extending substantially at right angles to each other and at right angles to the path of said beam, said system comprising four groups of conducting elements symmetrically positioned about said beam, each of said conducting elements including an enlarged portion and reduced portions extending therefrom, the reduced portions of the elements of each group being interleaved with the reduced portions of the elements of the adjacent groups, and means connecting a pair of independent sawtooth voltage sources to said conducting elements.

10. Apparatus for producing a fluctuating electrostatic field comprising a plate including spaced conducting portions, means for producing a sawtooth voltage wave, and means for applying said voltage wave to said portions to produce an electrostatic field parallel to said plate.

11. Apparatus in accordance with claim 10 in which said plate is rectangular and said conducting portions are triangular shaped, with the bases of adjoining portions positioned along opposite edges of said plate.

12. Apparatus for producing a pair of electrostatic fields positioned at right angles to each other in a given space including in combination, a first pair of parallel plates, a second pair of parallel plates positioned at right angles to said first pair of plates, each of said plates including spaced conducting portions, and means for applying a sawtooth voltage wave across adjacent conducting portions of said plates of each one of said pairs to produce a field extending parallel to said plates of said one pair and at right angles to said plates of the other pair.

13. An electrostatic deflection system for producing a first electrostatic field fluctuating at a relatively low frequency and a second electrostatic field extending at right angles to said first electrostatic field and fluctuating at a relatively high frequency, said system including in combination, four groups of conducting elements symmetrically positioned about a given space, each of said conducting elements including an enlarged portion and reduced portions extending therefrom, the reduced portions of the elements of each group being interleaved with the reduced portions of the elements of the adjacent groups whereby said four groups form a substantially completely enclosed structure, and a frequency separating network for connecting a first source of sawtooth voltage waves of relatively low frequency and a second source of sawtooth voltage waves of relatively high frequency to said conducting elements, said network effectively connecting said first source between the elements of an adjacent pair of groups and the elements of the remaining adjacent pair of groups, and effectively connecting said second source between the elements of different adjacent pairs of groups.

14. Apparatus for producing a pair of electrostatic fields positioned at right angles to each other comprising, first and second plates positioned at right angles to each other, ach one of said plates including spaced conducting elements, means for applying a sawtooth voltage wave between adjacent conducting elements of each one of said plates to produce an electrostatic field extending parallel to said one plate and at right angles to the other of said plates, so that each plate is ineffective to shunt the field produced by the other plate.

15. An electrostatic deflection system adapted to produce a pair of electrostatic fields in a given space which are positioned at right angles to each other comprising, a box-like structure positioned about said space having four parallel edges, said structure being formed of four groups of conducting elements each of which includes a pair of triangular portions extending at right angles to each other and having a common base, said bases of said conducting elements of each group extending along one edge of said box-like structure with the groups being interleaved to form a substantially completely enclosed structure, a pair of independent voltage sources for energizing said conducting elements, and means for connecting said elements to said voltage sources so that with respect to one voltage source one adjacent pair of groups of conducting elements are at one potential and the other adjacent pair of groups of elements are at a different potential, and with respect to the other voltage source different adjacent pairs of groups of elements are connected at the two potentials produced by said other voltage source.

16. An electrostatic deflection system adapted to produce a pair of electrostatic fields in a given space which are positioned at right angles to each other comprising a box-like structure defining said space and having four parallel edges, said structure being formed of four groups of conducting elements, each of said conducting elements including a pair of triangular portions extending at right angles to each other and having a common base, said bases of said conducting elements of each group extending along one edge of said box-like structure with the groups being positioned to form a substantially completely enclosed structure, a pair of independent voltage sources for energizing said conducting elements, and a bridge network adapted to connect each of said elements to both of said voltage sources, said network including four terminals adapted to be individually connected to said groups of conducting elements.

17. An electrostatic deflection system comprising a box-like structure having four parallel edges, said structure being formed of four groups of conducting elements, each of said conducting elements including a pair of triangular portions extending at right angles to each other and having a common base, said bases of said conducting elements of each group extending along one edge of said box-like structure with the groups being positioned to form a substantially completely enclosed structure, and means for energizing said elements to provide a pair of electrostatic fields extending at right angles to each other in the space within said structure.

KURT SCHLESINGER.

REFERENCES CITED

The following references are of record in the file of this patent:

UNITED STATES PATENTS

| Number | Name | Date |
|---|---|---|
| 2,076,086 | Ladner | Apr. 6, 1937 |
| 2,080,449 | Von Ardenne | May 18, 1937 |
| 2,123,636 | Schwartz | July 12, 1938 |
| 2,139,854 | Ruska | Dec. 13, 1938 |
| 2,152,363 | Ruska | Mar 28, 1939 |
| 2,170,251 | Schlesinger | Aug. 22, 1939 |
| 2,179,097 | Law | Nov. 7, 1939 |
| 2,179,112 | Barthelemy | Nov. 7, 1939 |
| 2,185,239 | Von Ardenne | Jan. 2, 1940 |
| 2,244,748 | Walker | June 10, 1941 |
| 2,245,581 | Ekstrand | June 17, 1941 |
| 2,293,539 | Gray | Aug. 18, 1942 |
| 2,302,118 | Gray | Nov. 17, 1942 |
| 2,449,975 | Bishop et al. | Sept. 28, 1948 |
| 2,472,727 | Salinger et al. | June 7, 1949 |